(12) United States Patent
Kloeppner et al.

(10) Patent No.: US 7,913,027 B2
(45) Date of Patent: Mar. 22, 2011

(54) CONFIGURABLE STORAGE ARRAY CONTROLLER

(75) Inventors: John R. Kloeppner, Buhler, KS (US);
Jeremy D. Stover, Wichita, KS (US);
Dennis E. Gates, Wichita, KS (US);
Jason M. Stuhlsatz, Dacula, GA (US);
Robert E. Stubbs, Longmont, CO (US);
Mohamad El-Batal, Westminster, CO (US)

(73) Assignee: LSI Corporation, Milpitas, CA (US)

( * ) Notice: Subject to any disclaimer, the term of this patent is extended or adjusted under 35 U.S.C. 154(b) by 64 days.

(21) Appl. No.: 12/419,840

(22) Filed: Apr. 7, 2009

(65) Prior Publication Data

US 2010/0257301 A1    Oct. 7, 2010

(51) Int. Cl.
*G06F 13/00* (2006.01)

(52) U.S. Cl. .......................................... 710/316

(58) Field of Classification Search ........... 710/316–317
See application file for complete search history.

(56) References Cited

U.S. PATENT DOCUMENTS

| | | | |
|---|---|---|---|
| 6,601,128 B1 * | 7/2003 | Burton et al. | 710/316 |
| 7,046,668 B2 * | 5/2006 | Pettey et al. | 370/392 |
| 7,080,190 B2 * | 7/2006 | Weber | 710/315 |
| 7,315,914 B1 * | 1/2008 | Venkatanarayanan et al. | 710/316 |
| 7,421,520 B2 * | 9/2008 | Wilkins et al. | 710/36 |
| 7,454,554 B1 * | 11/2008 | Norrie et al. | 710/316 |
| 7,676,625 B2 * | 3/2010 | Cassiday et al. | 710/316 |
| 2009/0327564 A1 * | 12/2009 | Chitlur | 710/305 |

* cited by examiner

*Primary Examiner* — Paul R Myers
(74) *Attorney, Agent, or Firm* — Daniel J. Santos; John M. Harman

(57) ABSTRACT

A configurable storage array controller can be configured to either a single-processor configuration or a multi-processor configuration by configuring a data bus switch system.

8 Claims, 4 Drawing Sheets

CONFIGURABLE STORAGE ARRAY CONTROLLER

TECHNICAL FIELD OF THE INVENTION

The invention relates generally to storage arrays and, more specifically, to a storage array controller having a scalable architecture.

BACKGROUND OF THE INVENTION

A storage array or disk array is a data storage device that includes multiple disk drives or similar persistent storage units. A storage array can allow large amounts of data to be stored in an efficient manner. A storage array also can provide redundancy to promote reliability, as in the case of a Redundant Array of Inexpensive Disks (RAID) storage array.

In addition to the disk drives or other persistent storage units, a storage array commonly also includes an enclosure, power supply, one or more controllers (typically in the form of one or more circuit boards), and interfaces to connect the storage array to an external host, such as a computer or network device. The controller includes one or more processors or similar logic that causes the storage array to read or write data to or from its persistent storage in response to requests received from an external host. A controller also commonly includes memory that acts as a buffer or temporary storage for data being transferred between the host and persistent storage. A controller further commonly includes host input/output (I/O) controllers (HICs) that interface the storage array controller with the host, and target I/O controllers (TICs) that interface the storage array controller with the disk drives or other persistent storage units. Providing a high-performance or otherwise efficient storage array controller architecture that can be implemented economically can be challenging.

One type of RAID storage array controller that has been used is based upon a combination of a substantially general-purpose processor (integrated circuit chip) and a specialized application-specific integrated circuit (ASIC). In combination with the processor, the ASIC provides optimized data paths and data transfer algorithms that promote fast and efficient data transfer between the host and the persistent storage units. Although a storage array controller architecture based upon the combination of an ASIC and general-purpose processor offers higher performance than an architecture based upon a general-purpose processor alone, a controller having the former architecture can be less economical to manufacture than a controller having the latter architecture due to the long and expensive process of developing an ASIC. However, providing a storage array controller architecture based entirely upon one or more substantially general-purpose processor and no specialized controller ASIC that provides comparable performance to an architecture having a specialized controller ASIC can be challenging. Furthermore, a storage array having a high-performance architecture can potentially be unattractive to those who seek an economical storage array.

SUMMARY

The invention relates to a configurable storage array controller that can be configured to either a single-processor configuration or a multi-processor (i.e., two or more processor) configuration by configuring a data bus switch system, such as a configurable Peripheral Interconnect-Express (PCIe) switch. In an exemplary or illustrative embodiment of the invention, the storage array controller includes an electronic assembly, such as a circuit board and associated elements, on which is provided a configurable data bus switch system, an I/O controller system, and places or mounts on which one or more processors and memory devices can be mounted, installed or otherwise received. In the dual-processor configuration, a first processor is installed in a first processor mount, a first memory is installed in a first memory mount, a second processor is installed in a second processor mount, and a second memory is installed in a second memory mount. Interconnections, such as circuit board traces, couple the first memory mount to the first processor mount, the second memory mount to the second processor mount, the configurable data bus switch to the first and second processor mounts, and the configurable data bus switch to portions of the I/O controller system.

The configurable data bus switch system is configured to have a first switching section and a second switching section. In the multi-processor configuration (e.g., a dual processor configuration in the exemplary embodiment), in which a first processor and first memory are installed in the respective first processor and first memory mounts, the first switching section is configured to have a port defining a first data bus coupled to the first processor, a port defining a second data bus coupled to the second processor, a port defining a third data bus coupled to a portion of the target I/O controller system, and a port defining a fourth data bus coupled to a portion of the host I/O controller system. In this configuration, the second switching section is configured to have a port defining a fifth data bus coupled to the second processor, a port defining a sixth data bus coupled to the first processor, a port defining a seventh data bus coupled to a portion of the target I/O controller system, and a port defining an eighth data bus coupled to a portion of the host I/O controller system.

In the single-processor configuration, in which no first processor and first memory are installed in the respective first processor and first memory mounts, the first switching section is configured to have a port defining a first data bus coupled to the second processor, a port defining a second data bus coupled to a portion of the target I/O controller system, and a port defining a third data bus coupled to a portion of the host I/O controller system. In this configuration, the second switching section is configured to have a port defining a fourth data bus coupled to the second processor, a port defining a fifth data bus coupled to a portion of the target I/O controller system, and a port defining an sixth data bus coupled to a portion of the host I/O controller system.

DETAILED DESCRIPTION OF AN ILLUSTRATIVE EMBODIMENT

Figure 1:
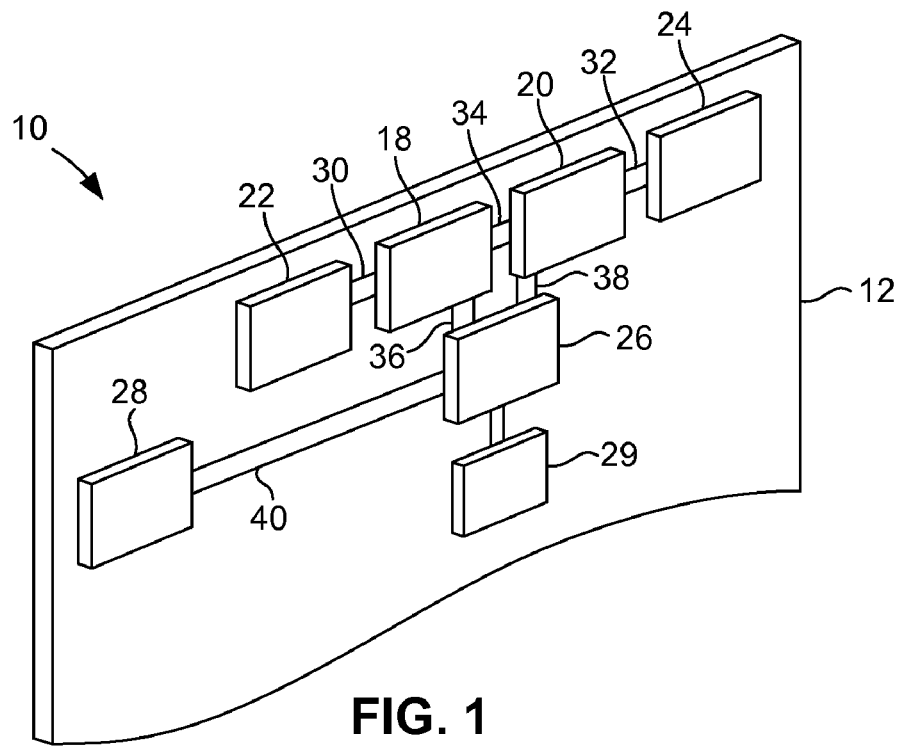
FIG. 1 is a conceptualized perspective view of a storage array controller in accordance with an exemplary embodiment of the present invention, showing the storage array controller in a first configuration.

As illustrated in FIG. 1, in an illustrative or exemplary embodiment of the invention, a storage array controller 10 includes one or more electronic assemblies comprising at least one circuit card 12 and associated elements (not shown for purposes of clarity) such as one or more electronic connectors, circuit card mounting hardware, etc. Although not shown for purposes of clarity, in use, storage array controller 10 is connected (e.g., by cables) to a host (computer) system and elements of a storage array system, including an array of disk drives or other persistent storage units. The storage array can be, for example, of the RAID type. As described below with regard to FIGS. 3 and 4, two such storage array controllers 10 and 10' can be used together in a mirrored arrangement and connected together via a backplane, cables, or other suitable means. Furthermore, although in the exemplary embodiment storage array controller 10 is shown as a standalone device, in other embodiments it can be integrated or combined with other types of electronic devices, such as computers, other types of storage devices, network devices, or elements thereof. In view of the descriptions in this patent specification ("herein"), and in view of the well understood principles by which storage arrays operate, persons skilled in the art to which the invention relates will readily be capable of including and using storage array controller 10 as part of a storage array system.

Figure 2:
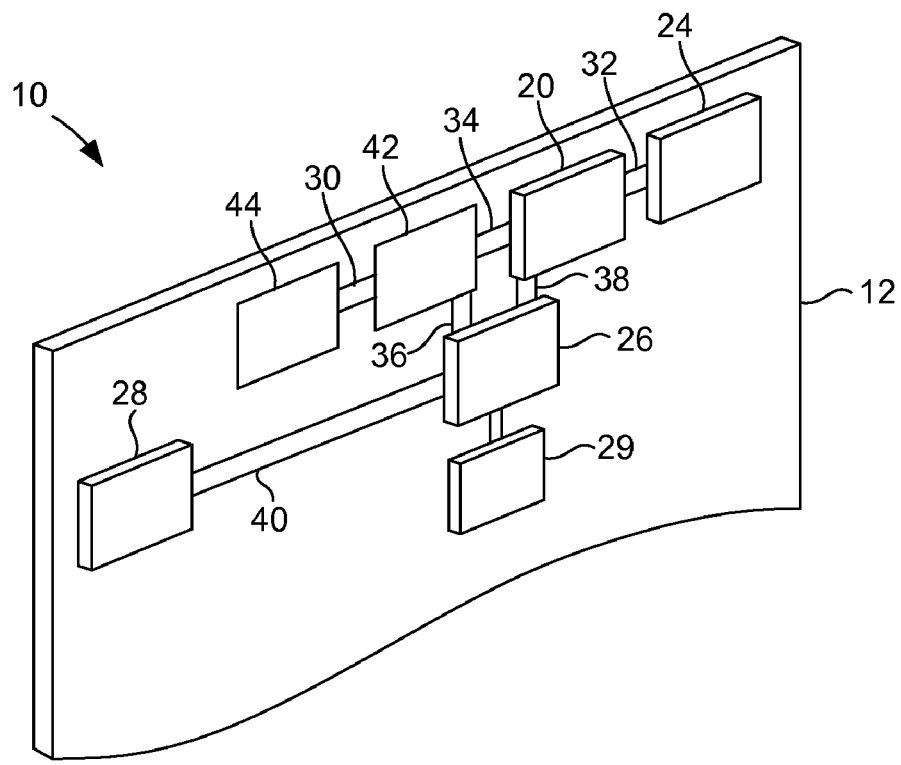
FIG. 2 is similar to FIG. 1, showing the exemplary storage array controller in a second configuration.

Mounted on circuit card 12 in the exemplary embodiment are a number of packaged electronic devices that can each include one or more integrated circuit chips: a first processor 18, a second processor 20, a first memory 22, a second memory 24, a data bus switch 26, and an input/output (I/O) controller system 28. The arrangement or layout in which these devices are shown mounted and interconnected on circuit card 12 in FIG. 1 is intended only as an example. For clarity and ease of description, the arrangement or layout shown in FIG. 1 generally corresponds to the arrangement shown in the architecture block diagrams of FIGS. 3 and 4 that are described below. However, persons skilled in the art will be capable of providing a suitable circuit card layout or other arrangement of the devices and their interconnections. It should also be noted that only a portion of circuit card 12 is shown in FIGS. 1 and 2 for purposes of clarity, and devices and elements other than those shown can also be mounted or otherwise disposed on circuit card 12. For example, suitable connectors can be provided for communicating electronic signals between the devices of storage array controller 10 and the host and disk drive array.

Each of first and second processors 18 and 20 can comprise a central processing unit (CPU) integrated circuit chip. For example, the processor chip can be of a type of CPU chip commonly used in embedded systems, such as any of those available from Intel Corporation of Santa Clara, Calif. Such processors have some features that facilitate RAID mirroring operations, but are otherwise (i.e., substantially) general-purpose processors. Each of memories 22 and 24 can comprise a group of one or more integrated circuit memory chips. For example, each of memories 22 and 24 can comprise a group of three memory modules containing double-data-rate three synchronous dynamic random access memory (DDR3 SDRAM), which provide a high data transfer rate.

Data bus switch 26 is a device that can be configured by loading configuration data into it from a suitable source, such as a serial EPROM 29 (electrically programmable read-only memory). Data bus switch 26 can conform to a bus specification, such as the well-known PCIe or "Peripheral Component Interconnect—Express" specification. An example of a suitable PCIe switch that can be configured by loading data into it from, for example, serial EPROM 29, is the ExpressLane™ PCI Express switch available from PLX Technology Inc. of Sunnyvale, Calif. as part number PEX8648.

Although the busses described herein can be of any suitable type, PCIe and similar bus technologies can provide some advantages over some previous bus technologies. While the older PCI or "Peripheral Component Interconnect" bus was a parallel data format bus that was primarily used for connecting computer peripheral device circuit cards to a computer motherboard, the PCIe bus is a versatile, high-bandwidth, serial I/O bus that lends itself to use throughout a computing device architecture. A PCIe bus provides a point-to-point connection, meaning that it does not share bus bandwidth but rather communicates directly with devices via a PCIe-compatible switch that directs data flow. The PCIe specification also provides bus scalability through a concept known as "lanes." Under the PCIe specification, a PCIe bus can have up to 32 lanes (in power-of-two multiples, i.e., 1, 2, 4, 16 or 32), with the number of lanes being referred to as "x1" for a single lane, "x2" for a dual lane, etc. In the exemplary embodiment described herein, all PCIe busses can be, for example, x8 PCIe busses.

Input/output controller system 28 can include any number of host I/O controllers (HICs) and associated interfaces to which the host computer system can be connected and any number of target I/O controllers (TICs) and interfaces to which the target devices, i.e., disk drives or other persistent storage units, can be connected. Although shown in FIGS. 1 and 2 as a unitary device for purposes of clarity, I/O controller system 28 can comprise any number of chips or other devices.

The above-described electronic devices can be physically, i.e., electrically, interconnected by bus-like circuit traces (i.e., metallized pathways on circuit card 12), wires, or any other similar (physical, electrical pathway) interconnections of the types commonly utilized in circuit cards or other electronic assemblies. As persons skilled in the art are readily capable of providing suitable interconnections, they are not described in further detail herein and such details are not shown in the conceptualized depiction in FIGS. 1 and 2. As shown in FIGS. 1 and 2: first memory interconnections 30 couple first processor 18 to first memory 22; second memory interconnections 32 couple second processor 20 to second memory 24; inter-processor interconnections 34 couple first processor 18 to second processor 20; first processor interconnections 36 couple data bus switch 26 to first processor 18; second processor interconnections 38 couple data bus switch 26 to second processor 20; and I/O interconnections 40 couple data bus switch 26 to I/O controller system 28.

Although shown in FIGS. 1 and 2 as unitary structures for purposes of clarity, each of the above-described interconnections can comprise multiple circuit traces or other electrical pathways, and can comprise multiple groups of such pathways. As described below, data busses can be defined on these interconnections by the combination of the (physical) interconnections themselves with the effects of data bus protocols and other data bus characteristics or specifications. As described below, data busses conforming to the PCIe specification can be defined, i.e., configured on the physical interconnections, by configuring data bus switch 26. Depending upon the configuration data loaded into data bus switch 26 from EPROM 29, data bus switch 26 can assume different data bus configurations on the same physical interconnections. Although in the exemplary embodiment data bus switch 26 is configured by loading data from EPROM 29, in other embodiments such a data bus switch can be configured in any other manner in which it is known to configure or program a device.

Aspects of a dual-processor configuration and a single-processor configuration of storage array controller 10 are illustrated in FIGS. 1 and 2, respectively. Embodiments in which still other multi-processor configurations can be provided, such as a configuration having more than two processors, are also contemplated within the realm of the invention. Note in FIG. 2 that first processor 18 and its associated first memory 22 are not present on circuit board 12 in the positions in which they are shown in FIG. 1. First processor 18 is mounted on circuit card 12 in a suitable first processor mount 42 in the dual-processor configuration shown in FIG. 1 but is not mounted on mount 42 in the single-processor configuration shown in FIG. 2. Likewise, first memory 22 is mounted on circuit card 12 in a suitable first memory mount 44 in the dual-processor configuration shown in FIG. 1 but is not mounted on mount 44 in the single-processor configuration shown in FIG. 2. Second processor 20 and its associated second memory 24 are similarly mounted in a second processor mount and second memory mount (not shown in FIG. 1 for purposes of clarity), respectively. A mount can comprise, for example, a socket mounted on circuit card 12 into which a processor or memory chip or module can be plugged, solder pads formed in circuit card 12 to which a processor or memory chip or module can be soldered, or any other structure that persons skilled in the art understand would be suitable for mounting an electronic device on an electronic assembly. In embodiments in which a memory comprises multiple chips, modules or other devices, a corresponding number of mounts can be included. In embodiments having more than two processors and associated memories, additional mounts are correspondingly included.

The dual-processor (or other multi-processor) configuration and single-processor configuration can provide different combinations of performance and economy from each other. With first processor 18 and first memory 22 omitted in the single-processor configuration, storage array controller 10 may be more economical than in the dual-processor configuration. Some users may prefer such economy to the higher performance (e.g., speed, data throughput, etc.) that may be obtained using storage array controller 10 in a multi-processor configuration. The configurability feature of the present invention can, for example, enable a storage array manufacturer or storage array controller manufacturer to use the same circuit card 12 in manufacturing either a dual-processor configuration of storage array controller 10 or, alternatively, a single-processor configuration of storage array controller 10.

Figure 3:
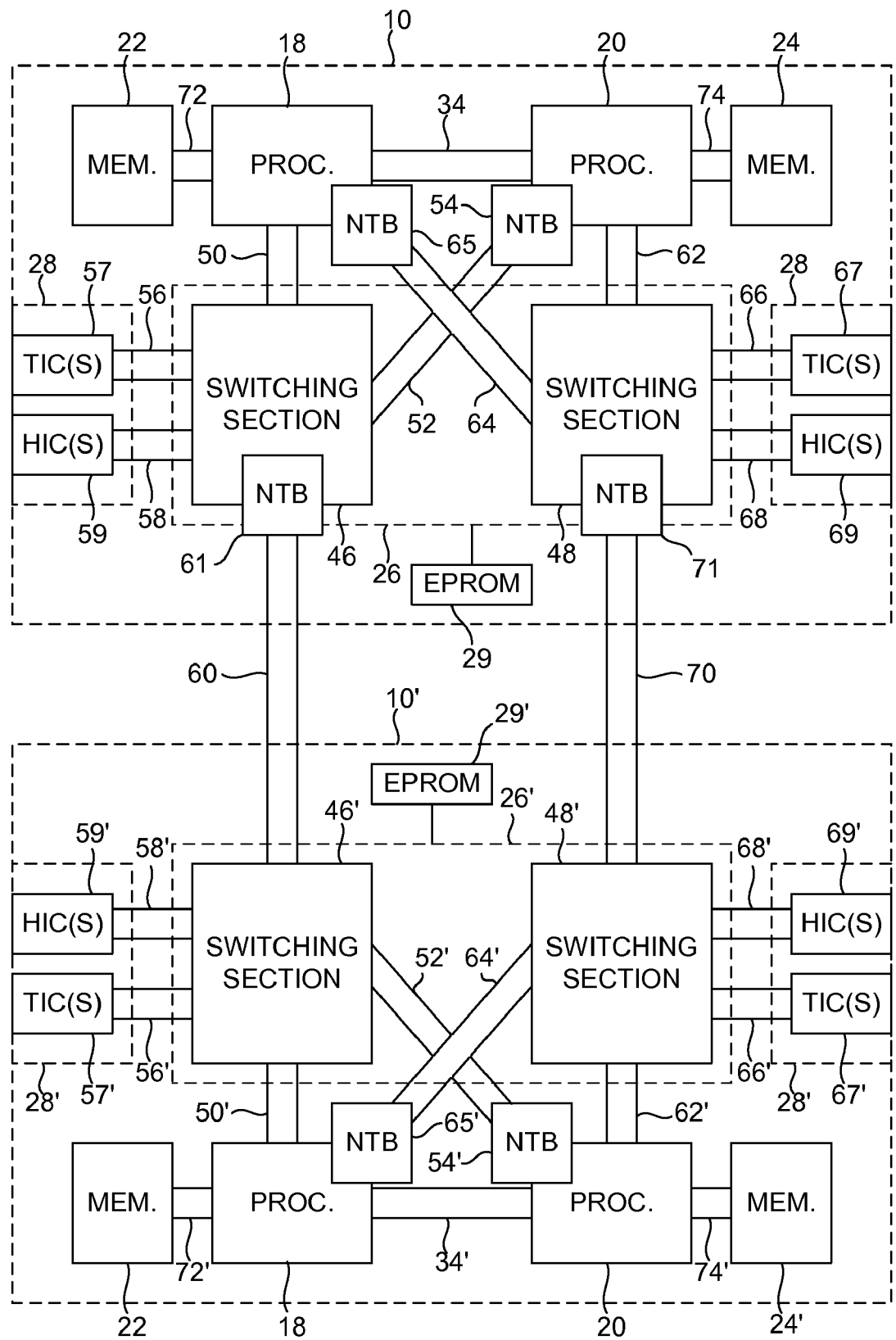
FIG. 3 is an architecture diagram of the exemplary storage array controller as configured in FIG. 1.

In the dual-processor configuration, storage array controller 10 is configured to have the architecture illustrated in FIG. 3. Data bus switch 26 is configured into a first switching section 46 and a second switching section 48. First switching section 46 is configured to constitute a first domain controlled by first processor 18, and second switching section 48 is configured to constitute a second domain controlled by second processor 20. It should be noted that although in the exemplary a single data bus switch 26 (i.e., a chip or other unitary electronic device) is configured into two switching sections 46 and 48, other embodiments can include a first data bus switch (not shown) that is equivalent to first switching section 46 and a second data bus switch that is equivalent to second switching section 48.

In the dual-processor configuration, first switching section 46 (or a second switch in other embodiments) has the following PCIe bus ports: a port defining a first bus 50 coupling first switching section 46 of data bus switch 26 to first processor 18; a port defining a second bus 52 coupling first switching section 46 of data bus switch 26 to second processor 20 (via a non-transparent bridge 54); a port defining a third bus 56 coupling first switching section 46 of data bus switch 26 to a portion of the target I/O controller system (e.g., to one of several individual target I/O controllers (TICs) 57); and a port defining a fourth bus 58 coupling first switching section 46 of data bus switch 26 to a portion of the host I/O controller system (e.g., to one of several individual host I/O controllers (HICs) 59). Still another port is configured to define a bus 60 that couples first switching section 46 of data bus switch 26 of storage array controller 10 to the first switching section 46' of data bus switch 26' (via a non-transparent bridge 61) of a corresponding (mirrored) storage array controller 10'. Non-transparent bridging (NTB) is commonly used to provide domain isolation between processors. Many commercially available PCIe switches allow one port to be configured as an NTB. Bus 60 can be provided via a cable, backplane, or other interconnection between circuit cards or other electronic assemblies along the lines of that described above with regard to FIGS. 1 and 2.

In the dual-processor configuration, second switching section 48 (or a second switch in other embodiments) has the following PCIe bus ports: a port defining a fifth bus 62 coupling second switching section 48 of data bus switch 26 to second processor 20; a port defining a sixth bus 64 coupling second switching section 48 of data bus switch 26 to first processor 18 (via a non-transparent bridge 65); a port defining a seventh bus 66 coupling second switching section 48 of data bus switch 26 to a portion of target I/O controller system (e.g., to one of several individual target I/O controllers 67); and a port defining an eighth bus 68 coupling second switching section 48 of data bus switch 26 to a portion of the host I/O controller system (e.g., to one of several individual host I/O controllers 69). Still another port is configured to define a bus 70 that couples second switching section 48 of data bus switch 26 of storage array controller 10 to the second switching section 48' of data bus switch 26' (via a non-transparent bridge 71) of a corresponding (mirrored) storage array controller 10'. Bus 70 can be provided via a cable, backplane, or other interconnection between circuit cards or other electronic assemblies along the lines of that described above with regard to FIGS. 1 and 2.

The transfer of data from a host to a storage array system for storage on the disks or other persistent storage units of the storage array system, i.e., a "write" operation, typically presents the greatest challenge in avoiding bottlenecks and otherwise maximizing performance. First and second memories 22 and 24 are used to buffer data destined for persistent storage. It is important that data received via any of host controllers 59 and 69 be efficiently routable to either of memories 22 and 24. The architecture illustrated in FIG. 3 allows storage array controller 10 to receive data via one of host I/O controllers 59 and route the data for storage in second memory 24 via third bus 56, first switching section 46, second bus 52, and second processor 20. Likewise, the architecture allows storage array controller 10 to receive data via one of host I/O controllers 69 and route the data for storage in first memory 22 via eighth bus 68, second switching section 48, sixth bus 64, and first processor 18. Such routing advantageously avoids the use of the inter-processor connections 34 (FIG. 1) that conform to a relatively limited-bandwidth bus specification, such as the Quick Path Interconnect™ (QPI) developed by Intel Corporation for interconnecting Intel processors. Such received data can be more quickly stored in memory by routing it through the above-referenced PCIe buses and a single processor than through a relatively limited-bandwidth QPI bus, two processors, etc. In addition, buses 60 and 70, as well as the bus 72 that couples first processor 18 to first memory 22 and the bus 74 that couples second processor 20 to second memory 24 can also be PCIe buses.

Figure 4:
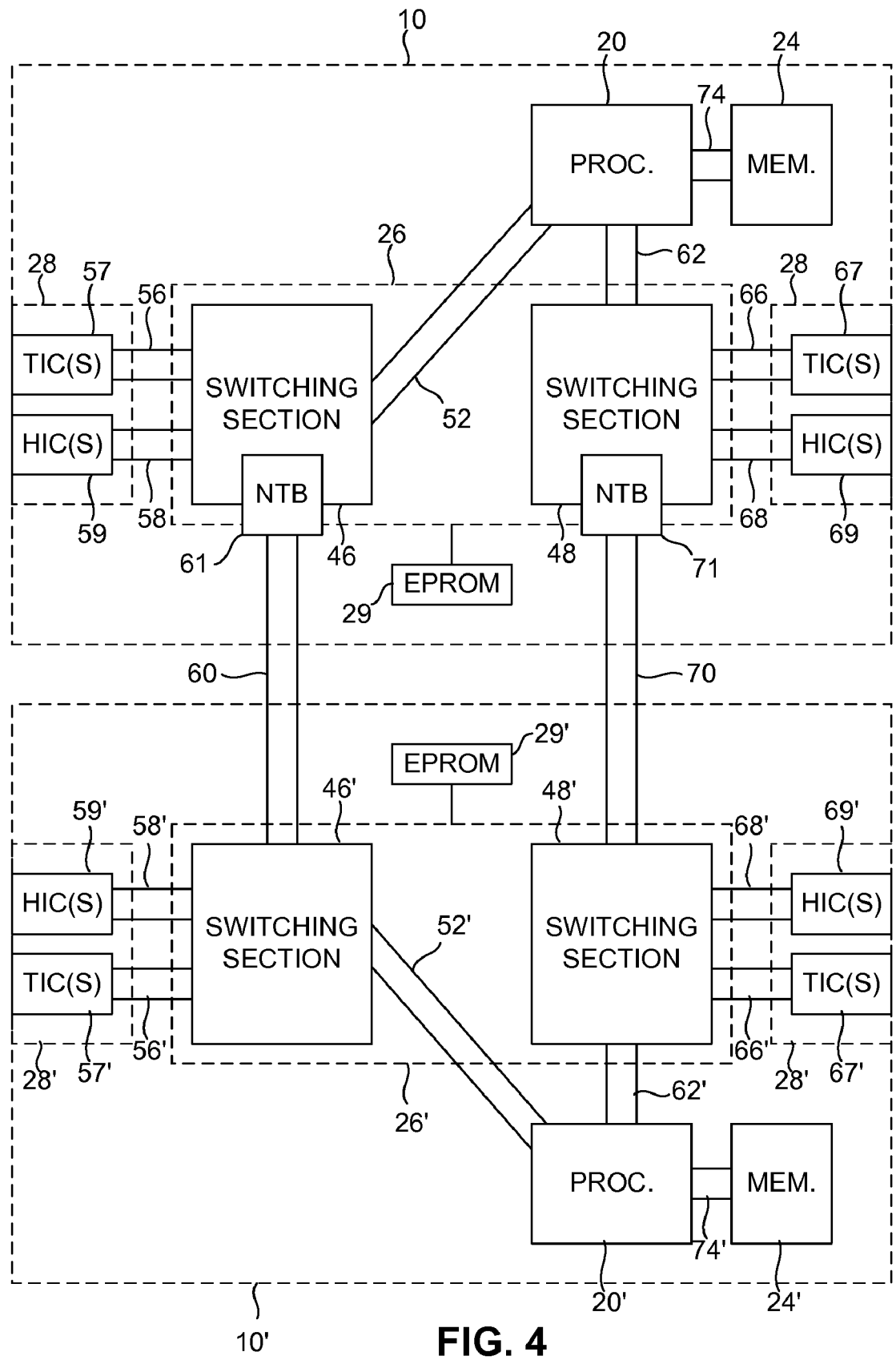
FIG. 4 is an architecture diagram of the exemplary storage array controller as configured in FIG. 2.

In the single-processor configuration, storage array controller 10 is configured to have the architecture illustrated in FIG. 4. Note that there is no first processor 18 or first memory 22 in this configuration, as they have been omitted or removed. It should be noted that the terms "first" and "second" are used herein with respect to various elements of the exemplary embodiment for purposes of clarity and convenience of description, and that the terms are not intended to imply any order. As in the dual-processor configuration, in the single-processor configuration data bus switch 26 is configured into first switching section 46 and second switching section 48. First switching section 46 and second switching section 48 are configured to constitute a single domain controlled by second processor 20. In accordance with the omission of first processor 18 and first memory 22 in the single-processor configuration, first switching section 46 (or a second switch in other embodiments) has all of the same ports that it has in the dual-processor embodiment except the port that defines first bus 50. In the single-processor configuration, second switching section 48 (or a second switch in other embodiments) has all of the same ports that it has in the single-processor configuration. Note that even though there is no first processor 18, second processor 20 nonetheless has access not only to host I/O controllers 69 to which it is coupled via second switching section 48 but also to host I/O controllers 59 to which it is coupled via first switching section 46. The presence of first processor 18 is not necessary in order for second processor 20 to be able to access all host I/O controllers of storage array controller 10, including those that might otherwise (in the absence of the invention) be under the domain of another processor.

Figure 5:
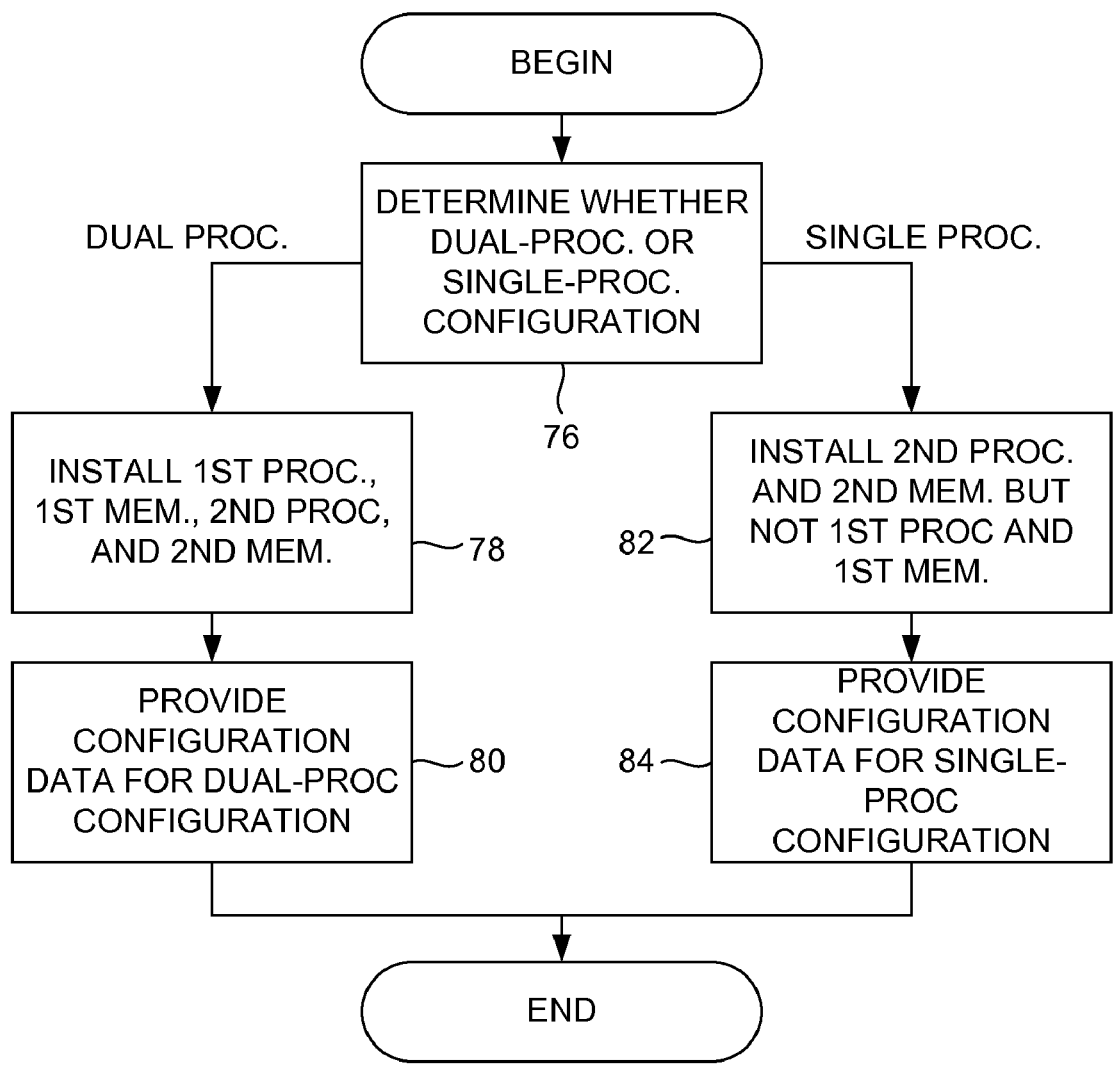
FIG. 5 is a flow diagram, illustrating an exemplary method for configuring a storage array controller.

An exemplary method for configuring the above-described storage array controller 10 is illustrated in FIG. 5. As indicated by block 76, it is first determined whether storage array controller 10 is to have a dual-processor configuration (or, more generally, a multi-processor configuration) or a single-processor configuration. Such a decision can be made by, for example, a manufacturer of storage array controller 10. The manufacturer can first produce circuit cards 12 (FIGS. 1 and 2) or systems that include such circuit cards or other such assemblies and then, for example, configure some of them to have dual-processor configurations (FIGS. 1 and 3) and others to have single-processor configurations (FIGS. 2 and 4).

As indicated by block 78, if a storage array controller 10 is to have a dual-processor configuration (or, more generally, a multi-processor configuration) then first processor 18, first memory 22, second processor 20 and second memory 24 are installed on circuit card 12 (FIG. 1) along with the other elements of the electronic assembly that storage array controller 10 comprises, as described above. As indicated by block 80, data bus switch 26 is further configured by providing an EPROM 29 in which data is stored that, upon initialization (e.g., power-up) or other operation of data bus switch 26, causes data bus switch 26 to assume the configuration represented by the architecture diagram of FIG. 3. In embodiments that include other configurable elements, such elements can also be configured accordingly. As well understood in the art, such a configurable PCIe data bus switch can be loaded or otherwise provided with data (software) to which logic in the switch, such as an embedded processor and associated memory, responds by configuring the switch. As persons skilled in the art understand how to configure a PCIe switch or similar device through the loading of data from an EPROM or similar external memory, such details are not described herein.

As indicated by block 82, if a storage array controller 10 is to have a single-processor configuration then first processor 18 and first memory 22 are not installed on circuit card 12 (FIG. 2), while second processor 20 and second memory 24 are installed on circuit card 12 along with the other elements of the electronic assembly that storage array controller 10 comprises, as described above. As indicated by block 84, data bus switch 26 is further configured by providing an EPROM 29 in which data is stored that, upon initialization (e.g., power-up) or other operation of data bus switch 26, causes data bus switch 26 to assume the configuration represented by the architecture diagram of FIG. 4. In embodiments that include other configurable elements, such elements can also be configured accordingly.

It should be noted that the invention has been described with reference to one or more exemplary embodiments for the purpose of demonstrating the principles and concepts of the invention. The invention is not limited to these embodiments. As will be understood by persons skilled in the art, in view of the description provided herein, many variations may be made to the embodiments described herein and all such variations are within the scope of the invention.

What is claimed is:

1. A configurable storage array controller, comprising:
   at least one host input/output (I/O) controller system;
   at least one target I/O controller system;
   a configurable data bus switch system, the configurable data bus switch system having a first switching section and a second switching section, the configurable data bus switch system being configurable between a single-processor configuration and a multi-processor configuration;
   a first processor mount for receiving a first processor;
   a second processor mount for receiving a second processor;
   a first memory mount for receiving a first memory;
   a second memory mount for receiving a second memory;
   first memory interconnections coupling the first memory mount to the first processor mount;
   second memory interconnections coupling the second memory mount to the second processor mount;
   first processor interconnections coupling the configurable data bus switch to the first processor mount;
   second processor interconnections coupling the configurable data bus switch to the second processor mount;
   first I/O interconnections coupling the configurable data bus switch to a portion of the host I/O controller system; and
   second I/O interconnections coupling the configurable data bus switch to a portion of the target I/O controller system;
   wherein in the multi-processor configuration in which a first processor is mounted in the first processor mount and a second processor is mounted in the second processor mount the first switching section has a port defining a first data bus coupled to the first processor via the first processor interconnections, a port defining a second data bus coupled to the second processor via the second processor interconnections, a port defining a third data bus coupled to a portion of the target I/O controller system, and a port defining a fourth data bus coupled to a portion of the host I/O controller system, and the second switching section has a port defining a fifth data bus coupled to the second processor via the second processor interconnections, a port defining a sixth data bus coupled to the first processor via the first processor interconnections, a port defining a seventh data bus coupled to a portion of the target I/O controller system, and a port defining an eighth data bus coupled to a portion of the host I/O controller system; and
   wherein in the single-processor configuration in which no first processor is mounted in the first processor mount and a second processor is mounted in the second processor mount the first switching section has a port defining a first data bus coupled to the second processor via the second processor interconnections, a port defining a second data bus coupled to a portion of the target I/O controller system, and a port defining a third data bus coupled to a portion of the host I/O controller system, and the second switching section has a port defining a fourth data bus coupled to the second processor via the second processor interconnections, a port defining a fifth data bus coupled to a portion of the target I/O controller system, and a port defining an sixth data bus coupled to a portion of the host I/O controller system.

2. The configurable storage array controller claimed in claim 1, wherein each of the first, second, third, fourth, fifth, sixth, seventh and eighth data buses is a Peripheral Component Interconnect Express (PCIe) bus having a plurality of lanes.

3. The configurable array controller claimed in claim 1, wherein the first and second processors are coupled together by a Quick Path Interconnect (QPI) bus.

4. The configurable storage array controller claimed in claim 1, wherein:
the first switching section is controlled by the first processor as a first domain; and
the second switching section is controlled by the second processor as a second domain.

5. The configurable storage array controller claimed in claim 1, wherein:
the host I/O controller system comprises a first plurality of host I/O controllers coupled to the first switching section and a second plurality of host I/O controllers coupled to the second switching section; and
the target I/O controller system comprises a first plurality of target I/O controllers coupled to the first switching section and a second plurality of target I/O controllers coupled to the second switching section.

6. The configurable storage array controller claimed in claim 1, wherein:
the second data bus is coupled to a non-transparent bridge on the second processor; and
the sixth data bus is coupled to a non-transparent bridge on the first processor.

7. A method for configuring a storage array controller having a configurable data bus switch system, the method comprising:
determining which of a single-processor configuration and a multi-processor configuration is selected;
installing a first processor in a first processor mount of the storage array controller and installing a second processor in a second processor mount of the storage array controller if the multi-processor configuration is selected;
installing no first processor in the first processor mount of the storage array controller and installing a second processor in the second processor mount of the storage array controller if the single-processor configuration is selected;
if the multi-processor configuration is selected, configuring the configurable data bus switch system to have a first switching section with a port defining a first data bus coupled to the first processor, a port defining a second data bus coupled to the second processor, a port defining a third data bus coupled to a portion of a target I/O controller system, and a port defining a fourth data bus coupled to a portion of a host I/O controller system, and configuring the configurable data bus switch system to have a second switching section with a port defining a fifth data bus coupled to the second processor, a port defining a sixth data bus coupled to the first processor, a port defining a seventh data bus coupled to a portion of the target I/O controller system, and a port defining an eighth data bus coupled to a portion of the host I/O controller system; and
if the single-processor configuration is selected, configuring the configurable data bus switch system to have a first switching section with a port defining a first data bus coupled to the second processor, a port defining a second data bus coupled to a portion of the target I/O controller system, and a port defining a third data bus coupled to a portion of the host I/O controller system, and configuring the configurable data bus switch system to have a second switching section with a port defining a fourth data bus coupled to the second processor, a port defining a fifth data bus coupled to a portion of the target I/O controller system, and a port defining an sixth data bus coupled to a portion of the host I/O controller system.

8. The method claimed in claim 7, further comprising:
if the multi-processor configuration is selected, installing a configuration memory device in the storage array controller in which multi-processor configuration data is stored; and
if the single-processor configuration is selected, installing a configuration memory device in the storage array controller in which single-processor configuration data is stored;
wherein the configuration data is data to which the configurable data bus switch system responds by assuming a configuration.

* * * * *